(12) United States Patent
Aastuen et al.

(10) Patent No.: US 8,100,535 B2
(45) Date of Patent: Jan. 24, 2012

(54) STRESS BIREFRINGENCE COMPENSATION IN POLARIZING BEAMSPLITTERS AND SYSTEMS USING SAME

(75) Inventors: David J. W. Aastuen, Shoreview, MN (US); Charles L. Bruzzone, Woodbury, MN (US); Jiaying Ma, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/765,503

(22) Filed: Apr. 22, 2010

(65) Prior Publication Data

US 2010/0208210 A1      Aug. 19, 2010

Related U.S. Application Data

(62) Division of application No. 12/037,334, filed on Feb. 26, 2008, now Pat. No. 7,731,366, which is a division of application No. 11/088,153, filed on Mar. 23, 2005, now Pat. No. 7,357,511.

(51) Int. Cl.
*G03B 21/14* (2006.01)
*G03B 21/28* (2006.01)
*G02F 1/1335* (2006.01)
*H04N 9/07* (2006.01)
*F21V 9/14* (2006.01)
*G02B 27/14* (2006.01)
*G02B 27/12* (2006.01)

(52) U.S. Cl. ............. 353/20; 353/33; 353/81; 353/84; 349/96; 349/57; 348/337; 362/19; 359/638; 359/640; 359/251

(58) Field of Classification Search ............. 353/20, 353/33, 81, 84; 349/96, 57; 348/337; 362/19, 362/337, 339; 359/496, 638, 640, 251
See application file for complete search history.

(56) References Cited

U.S. PATENT DOCUMENTS

| 4,943,154 A | 7/1990 | Miyatake et al. |
| 5,327,270 A | 7/1994 | Miyatake |
| 5,472,635 A | 12/1995 | Iida et al. |
| 5,490,003 A | 2/1996 | Van Sprang |

(Continued)

FOREIGN PATENT DOCUMENTS

JP      02-250026      10/1990

(Continued)

OTHER PUBLICATIONS

Bruzzone, et al., "High-Performance LCoS Optical Engine Using Cartesian Polarizer Technology" *SID 03 Digest*, (2003) pp. 1-4.

(Continued)

*Primary Examiner* — Georgia Y Epps
*Assistant Examiner* — Magda Cruz
(74) *Attorney, Agent, or Firm* — Kristofor L. Storvick

(57) ABSTRACT

An optical system is provided. The optical system comprises a first polarizing beamsplitter (PBS), a first reflecting image-forming device, and a first quarter-wave retarding element. An optical system is also provided that comprises an image-forming device, a reflective polarizing layer, at least a first birefringent element disposed on an optical path between the image-forming device and the polarizing layer, and a quarter-wave retarding element. Further provided is an optical system comprising a color combiner unit, at least two polarizing beamsplitters (PBSs), and a first quarter-wave retarding element. The present application also provides methods of compensating for birefringence in an image projection system.

3 Claims, 10 Drawing Sheets

U.S. PATENT DOCUMENTS

| | | | |
|---|---|---|---|
| 5,576,854 A | 11/1996 | Schmidt et al. | |
| 5,737,048 A | 4/1998 | Abileah et al. | |
| 6,340,999 B1 | 1/2002 | Masuda et al. | |
| 6,486,997 B1 | 11/2002 | Bruzzone et al. | |
| 6,490,087 B1 | 12/2002 | Fulkerson et al. | |
| 6,501,523 B2 | 12/2002 | Hirota et al. | |
| 6,609,705 B1 | 8/2003 | Schindler et al. | |
| 6,609,795 B2 | 8/2003 | Weber et al. | |
| 6,669,343 B2 * | 12/2003 | Shahzad et al. | 353/20 |
| 6,669,344 B2 * | 12/2003 | Ishii | 353/20 |
| 6,672,721 B2 | 1/2004 | Aastuen et al. | |
| 6,709,110 B2 | 3/2004 | Domroese et al. | |
| 6,719,426 B2 | 4/2004 | Magarill et al. | |
| 6,721,096 B2 | 4/2004 | Bruzzone et al. | |
| 6,786,604 B2 | 9/2004 | Aastuen et al. | |
| 6,834,964 B2 | 12/2004 | Nishihara et al. | |
| 7,071,263 B2 | 7/2006 | Cheng et al. | |
| 7,147,333 B2 | 12/2006 | Shirota | |
| 7,234,816 B2 * | 6/2007 | Bruzzone et al. | 353/20 |
| 7,237,899 B2 | 7/2007 | Ma et al. | |
| 7,364,302 B2 | 4/2008 | Conner | |
| 2003/0058537 A1 | 3/2003 | Domroese et al. | |
| 2003/0147157 A1 | 8/2003 | Kamimura et al. | |
| 2004/0227898 A1 | 11/2004 | Ma et al. | |
| 2005/0128438 A1 | 6/2005 | Kang et al. | |

FOREIGN PATENT DOCUMENTS

| | | |
|---|---|---|
| JP | 09-508709 | 9/1997 |

OTHER PUBLICATIONS

Cline, et al., "Thermal stress birefringence in LCOS projection displays", Displays 23 (2002) pp. 151-159).

Schott Optical Glass Data Sheets, p. 12, As of Sep. 17, 2001, May 23, 2011, www.us.schott.com.

* cited by examiner

STRESS BIREFRINGENCE COMPENSATION IN POLARIZING BEAMSPLITTERS AND SYSTEMS USING SAME

RELATED PATENT APPLICATION

This patent application is a divisional of U.S. patent application Ser. No. 12/037,334, filed on Feb. 26, 2008 now U.S. Pat. No. 7,731,366, now allowed; which is a divisional of U.S. patent application Ser. No. 11/088,153, filed on Mar. 23, 2005, now issued as U.S. Pat. No. 7,357,511, and which is incorporated herein by reference in its entirety.

FIELD

The invention relates to optical systems and more particularly to the optical systems that use polarizing beamsplitters for separating or combining light beams in different polarization states.

BACKGROUND

The function of a polarizing beamsplitter (PBS) is to reflect light in one polarization state and to transmit light in the orthogonal polarization state. Consequently, PBSs find widespread use in optical systems that rely on the polarization of the light. An example of one such system is an image projection system that uses a reflective liquid crystal display (LCD) panel for modulating an illumination light beam: a polarized illumination light beam is directed to the LCD panel, for example by reflection in the PBS. The light beam is spatially modulated by the LCD panel so that the reflected beam contains some unmodulated light in the polarization state of the illumination beam and some modulated light in the orthogonal polarization state. The unmodulated, non-image light is reflected by the PBS and the modulated, image light, which contains the desired image, is transmitted through the PBS. Thus, the PBS separates the image light from the non-image light and the image light can then be projected to a screen for viewing by a user.

Different types of PBS may be used: projection systems have been reported using MacNeille PBSs, which rely on a stack of quarter wave films of isotropic material oriented at Brewer's angle for one of the polarization states, and using a Cartesian multilayer optical film (MOF) PBS, which uses a stack of alternating isotropic and birefringent polymer materials. The Cartesian MOF PBS is capable of operating at lower f-numbers and with higher contrast and transmission than the MacNeille PBS.

PBSs are often formed as a polarizing layer sandwiched between the hypotenuses of two right-angled, glass prisms. If, however, there is any birefringent retardation in the glass prism lying between the polarizing layer and the imager panel, the contrast provided by the PBS can be reduced because the nominally s-polarized illumination light reflected from the polarizing surface is rotated to being partially p-polarized when incident at the imager panel. This causes leakage of light after reflection from the imager panel, resulting in an increase in the level of brightness in the dark state and, therefore, a reduction in the contrast. Birefringent retardation in the glass prism may result from a number of different causes, for example, mechanical stresses induced in the PBS components while assembling the PBS, or stresses induced by the PBS fixture or by thermal expansion in the PBS when subjected to the intense illumination light beam. In addition, if hardware to mount an imaging device is attached to the input prism of a PBS, this will usually result in dramatic contrast reductions, over at least some regions of the PBS, due to resulting stresses in the glass.

In an effort to overcome this problem, a significant amount of work was done by glass manufacturers to make glass with a low stress-optic coefficient (SOC) that develops very little birefringence in response to mechanical stress. PBH56 and SF57 are example glasses of this type, made by Ohara and Schott respectively. Such glasses contain lead in significant quantities: both PBH56 and SF57 contain more than 70% lead oxide by weight. These low SOC glasses are, therefore, not environmentally desirable materials and are also expensive and difficult to process. Additionally, the low SOC glasses have a high refractive index, in excess of 1.8, which may lead to optical inefficiencies or aberrations when matching to the lower refractive index polarizing layers.

SUMMARY

One embodiment of the invention is directed to an optical unit that comprises a polarizing beamsplitter (PBS). The PBS has a first cover having a first surface and a second surface for transmitting a light beam and a second cover having at least a first surface for transmitting a light beam. The second cover is arranged with its first surface opposing the first surface of the first cover. A reflective polarizing layer is disposed between the first surfaces of the first and second covers. A quarter-wave retarding element is disposed proximate the second surface of the first cover. The quarter-wave retarding element is aligned substantially to maximize compensation for birefringence of the first cover for light that is double-passed through the first cover, between the first and second surfaces.

Another embodiment of the invention is directed to an optical system that comprises a first polarizing beamsplitter (PBS) having a reflective polarizing layer disposed between first and second covers. The first cover is formed of a material having a stress optic coefficient greater than $0.1 \times 10^{-6}$ mm$^2$ N$^{-1}$. A first reflecting image-forming device faces a first surface of the first cover so that light passes through the first cover from the reflective polarizing layer of the first PBS to the first reflecting image-forming device and is reflected from the reflecting image-forming device through the first cover to the reflective polarizing layer of the first PBS, the light being subject to stress birefringence in the first cover and to residual birefringence in the reflecting image-forming device. A first quarter-wave retarding element is disposed to retard the light passing between the first surface of the first cover and the reflecting image-forming device.

Another embodiment of the invention is directed to an optical system, that has an image-forming device and a reflective polarizing layer disposed to reflect light in a selected polarization state to or from the image-forming device. A birefringent element is disposed on an optical path between the image-forming device and the polarizing layer. The birefringent element has a face substantially perpendicular to the optical path. The birefringence of the birefringent element is non-uniform so that values of birefringent retardation for light passing through different portions of the face are different. A quarter-wave retarding element is disposed between the birefringent element and the image-forming device. The quarter-wave retarding element is oriented to at least partially compensate retardation of light on a round trip between the reflective polarizing layer and the image-forming element.

Another embodiment of the invention is directed to an optical system that comprises a color combiner unit having at least two entrance faces associated with different color bands and at least two polarizing beamsplitters (PBSs) operatively disposed relative to the at least two entrance faces respectively. At least a first PBS of the at least two PBSs comprises a first reflective polarizing layer disposed between respective first surfaces of first and second covers. The second cover is positioned between the reflective polarizing layer and the color combiner unit. The first cover is formed of a transparent material having a stress-optic coefficient (SOC) greater than $0.1 \times 10^{-6}$ mm$^2$ N$^{-1}$. The first PBS defines a first plane of reflection. The first cover of the first PBS lies between a quarter-wave retarding element and the reflective polarizing layer. The quarter-wave retarding element has a fast axis oriented non-parallel and non-perpendicular to the first plane of reflection.

Another embodiment of the invention is directed to a method of compensating for birefringence in an image projection system. The method includes polarizing light at a polarizing layer substantially into a selected polarization state and directing the polarized light to an image-forming device through a birefringent element. The polarized light is reflected at the image-forming device and the reflected polarized light is analyzed at the polarizing layer. The polarized light and the reflected polarized light are passed through a quarter-wave retarding element disposed between the birefringent element and the image-forming device. The quarter-wave retarding element is oriented to substantially optimize compensation of retardance in the birefringent element.

The above summary of the present invention is not intended to describe each illustrated embodiment or every implementation of the present invention. The following figures and detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
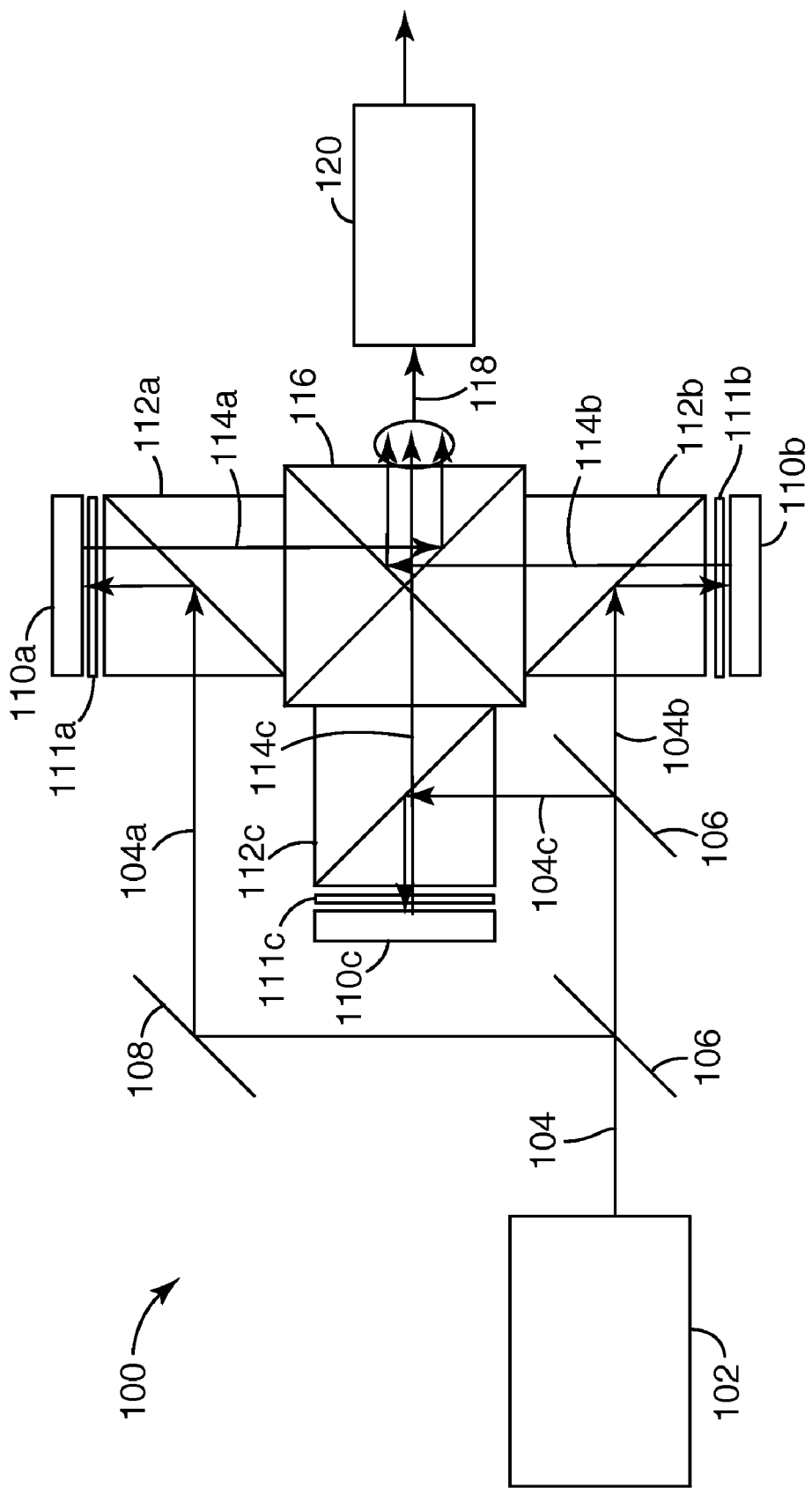
FIG. 1 schematically illustrates an embodiment of a projection system according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to systems that use polarizing beamsplitters (PBSs), and is believed to be particularly useful for image projection systems that incorporate PBSs for separating image light generated using a polarization modulator from illumination light. While the invention may be useful in any application where a PBS is used, it is described below particularly as used in projection systems. The scope of the invention is not intended to be limited to only projection systems.

The invention may be used in many different types of projection system. One exemplary embodiment of a multi-panel projection system 100 that may incorporate the invention described below is schematically illustrated in FIG. 1. The projection system 100 is a three-panel projection system, having a light source 102 that generates a light beam 104, containing light in three different color bands. The light beam 104 is split by color splitting elements 106 for example, dichroic mirrors, into first, second and third beams 104*a*, 104*b* and 104*c* containing light of different colors. The beams 104*a*, 104*b* and 104*c* may be, for example, red, green and blue in color respectively. Beam steering elements 108, for example mirrors or prisms, may be used to steer any of the beams 104, 104*a*, 104*b* and 104*c*.

The beams 104*a*, 104*b* and 104*c* are directed to respective image forming devices 110*a*, 110*b* and 110*c* which may be, for example, LCD-based reflective image-forming panels, such as liquid crystal on silicon (LCoS) panels. The light beams 104*a*, 104*b* and 104*c* are coupled to and from the respective image-forming devices 110*a*, 110*b* and 110*c* via respective polarizing beamsplitters (PBSs) 112*a*, 112*b* and 112*c*. The image-forming devices 110*a*, 110*b* and 110*c* polarization modulate the incident light beams 104*a*, 104*b* and 104*c* so that the respective image beams 114*a*, 114*b* and 114*c* are separated by the PBSs 112*a*, 112*b* and 112*c* and pass to the color combiner unit 116. In the illustrated exemplary embodiment, the illumination light beams 104*a*, 104*b* and 104*c* are reflected by the PBSs 112*a*, 112*b* and 112*c* to the image-forming devices 110*a*, 110*b* and 110*c* and the resulting image light beams 114*a*, 114*b* and 114*c* are transmitted through the PBSs 112*a*, 112*b* and 112*c*. In another approach, not illustrated, the illumination light may be transmitted through the PBSs to the image-forming devices, while the image light is reflected by the PBSs.

Quarter-wave retardation elements 111*a*, 111*b*, 111*c* are positioned between the image-forming devices 110*a*, 110*b*, 110*c*, and their respective PBSs 112*a*, 112*b*, 112*c*. The quarter-wave retardation elements 111*a*, 111*b*, 111*c* may be used for compensating for residual birefringence in the image forming devices 110*a*, 110*b*, 110*c* and, as is explained in greater detail below, for compensating birefringence in the PBSs 112*a*, 112*b*, 112*c*.

In the illustrated exemplary embodiment, the color combiner unit 116 combines image light beams 114a, 114b and 114c of different colors, for example using one or more dichroic elements. In particular, the illustrated exemplary embodiment shows an x-cube color combiner, but other types of combiner may be used. The three image beams 114a, 114b and 114c are combined in the color combiner unit 116 to produce a single, colored image beam 118 that may be directed by a projection lens system 120 to a screen (not shown).

Other embodiments of projection systems may use one or more PBSs. For example, a projection system may use one or two image-forming devices, with respective PBSs, as is described in greater detail in U.S. patent application Ser. Nos. 10/439,449 and 10/914,596, incorporated herein by reference. The maximum number of image-forming devices is not limited to three, and projection systems may use more than three image-forming devices. In addition, different types of light sources may be used, including white light sources, such as high-pressure mercury lamps, and colored light sources, such as light emitting diodes. The intention is not to limit how the illumination light reaching the PBS is generated, or how the light is processed before reaching the PBS.

High quality polarizing beamsplitters (PBSs) for providing high contrast images in projection systems have previously required the use of glasses having a low stress optic coefficient (SOC), also known as photoelastic constant. Examples of low SOC glasses include PBH56 and SF57 glasses. These glasses have high lead content, for example 70% weight lead oxide or more, and a high refractive index, in excess of 1.8. The use of high quantities of lead in the PBS glass leads to environmental concerns. In addition, since the polarizing layers in a multilayer optical film polarizer have a refractive index typically in the range of about 1.5-1.6, the refractive index difference between the polarizing layers and the glass is high, which may lead to a sub-optimal angle of incidence on the polarizing layer when the low SOC glass is used. This relatively large refractive index difference may lead to aberrations which can be addressed in the optical design of the system or the PBS itself, for example as discussed in U.S. Pat. Nos. 6,672,721 and 6,786,604. Also, the low SOC glasses have a low Abbé number, which means that the dispersion is high, and so SOC glasses may be less suitable for applications covering a wide range of wavelengths.

The elimination of lead from products is an important environmental objective, and one that affects the performance of birefringence sensitive optical systems. The present invention is directed to the use of standard glasses, for example N-BK7, N-SK5, and the like, available from Schott North America, Duryea, Pa., or equivalent glasses. For example, S-BAL35 and ZK3 are roughly equivalent to NSK5, and are respectively supplied by Ohara Incorporated, Japan and Chengdu Guangming, China, respectively. Although these glasses have high values of SOC, for example more than up to one hundred times that of the low SOC glasses listed above, they may be used according to the present invention in PBS applications that maintain high contrast, even when subject to the stresses experienced in illuminating an imaging core for projection televisions. These standard glasses do not contain lead.

Many unsuccessful attempts have been made to use lead-free glass in imaging PBS applications. For example, Cline et al. (Thermal stress birefringence in LCOS projection displays, Display 23 (2002) pp. 151-159) analyzed and tested a number of glasses for illumination-induced thermal stress birefringence, i.e., the stress birefringence that arises due to absorptive heating of the glass when illuminated by illumination light. The analysis produced a figure of merit for illumination-induced thermal stress birefringence, which suggested that the illumination-induced thermal stress birefringence of SK5, BK7 and Ultran 30 might be sufficiently low for use in projection television systems. Cline et al. noted, however, that their analysis did not take into account other sources of stress birefringence, including mechanical stresses arising from assembly and mounting, and thermal stresses arising for reasons other than illumination, for example cooling fans, heat from electronics or heat absorbed and radiated by the reflective imager. Some additional stress birefringence may arise, for example, due to the adhesive used between the polarizing layer and the glass prism of the PBS. This adhesive may, for example, cure in such a way as to produce stress in the glass cover, which leads to fabrication stresses. Furthermore, operation at elevated temperatures may lead to an additional thermally induced stresses arising from different thermal expansion coefficients among the adhesive, the glass cover and/or the polarizing layer. These additional sources of stress induce significant stress birefringence, over and above the illumination-induced thermal birefringence discussed by Cline, resulting in these non-leaded glasses being unsuited for simply replacing the low SOC glasses in a PBS used in a projection system. Experimental results are provided below that show that the contrast of a PBS can be significantly compromised when using N-SK5 glass.

Rather than eliminating the birefringence in a PBS component, some embodiments of the invention are directed to an approach for compensating the effects of birefringent optical glass in a PBS component. While the invention is believed to be useful for many different types of reflective polarizer layer in a PBS, it is believed to be particularly useful for Cartesian Multilayer Optical Film (MOF) PBSs, for example the polarizing films described co-owned U.S. Pat. No. 6,486,997, incorporated herein by reference. The invention may also be effective for the other types of PBSs, such as the MacNeille PBS and a wire grid PBS, with a glass element between the polarizing layer and the image-forming device.

The glasses that may be used in the present invention include glasses that have a refractive index of less than 1.8, less than 1.7 and even less than 1.6. In addition, the value of SOC for the glass in one embodiment may be greater than $0.1 \times 10^{-6}$ mm$^2$ N$^{-1}$, in another embodiment greater than $0.5 \times 10^{-6}$ mm$^2$ N$^{-1}$ or in another embodiment may be greater than $1.0 \times 10^{-6}$ mm$^2$ N$^{-1}$. Some examples of lead-free glass that may be used in the present invention to provide high contrast operation of a PBS include N-SK5 and N-BK7 glass, available from Schott North America, Duryea, Pa. N-SK5 glass has an SOC value of $2.16 \times 10^{-6}$ mm$^2$ N$^{-1}$ in the visible spectrum, and NBK-7 has an SOC value of $2.7 \times 10^{-6}$ mm$^2$ N$^{-1}$. This is more than twenty times the SOC of PBH56 glass ($0.09 \times 10^{-6}$ mm$^2$ N$^{-1}$) and more than one hundred times the SOC of SF57 glass ($0.02 \times 10^{-6}$ mm$^2$ N$^{-1}$). Consequently, the lead-free glasses can be about twenty to one hundred times more sensitive to mechanical and/or thermal stress than the high-lead glasses. A PBS assembled with no stress can still be sensitive to the stresses developed by thermal excursions and the absorption of moisture in the adhesives and in the polymer films of the multilayer polarizer. As is discussed below, even when a stress-free PBS was prepared initially, it is difficult to use the PBS with a mirror dark state and maintain good dark state uniformity as the PBS heats, cools, and is fixtured in place.

A quarter-wave retarding element, such as a quarter-wave film or quarter-wave plate, disposed between the PBS and the image-forming device, may be used to at least partially compensate for the stress-related birefringence in the lead-free glass. This reduces the degradation in contrast usually associated with using conventional, lead-free, glasses in a PBS.

Figure 2:
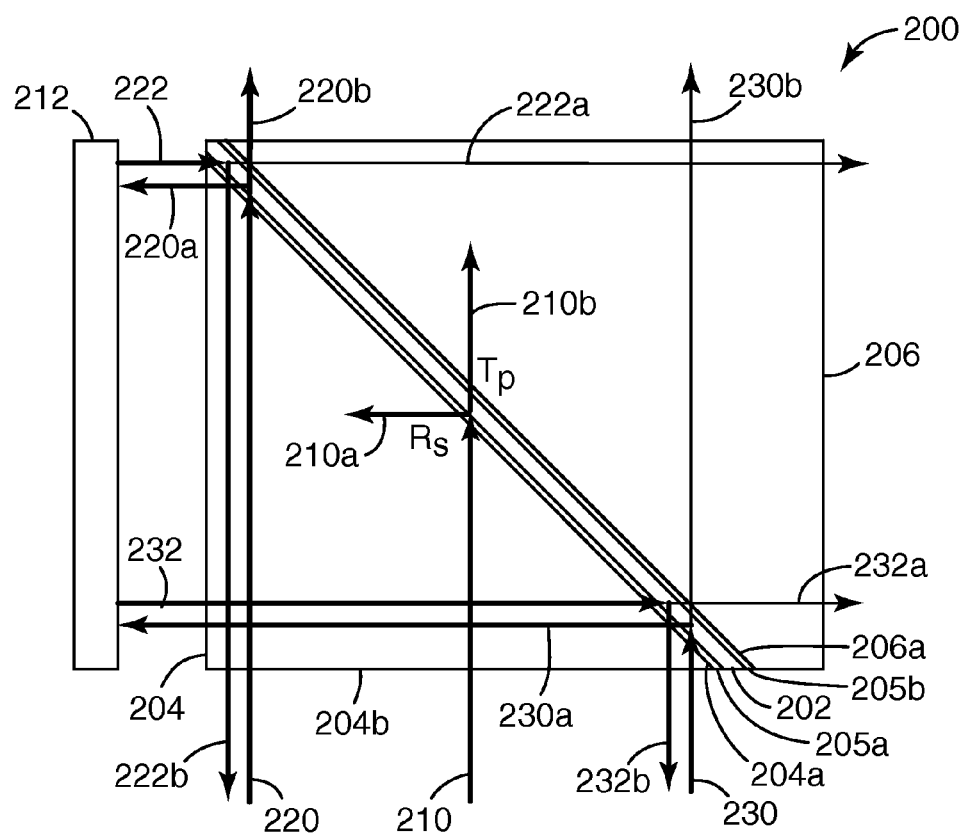
FIG. 2 schematically illustrates the operation of a polarizing beamsplitter.

The birefringence of a stressed PBS is now described in greater detail with reference to FIG. 2, which schematically illustrates a PBS 200 that has a reflective polarizing layer 202 sandwiched between opposing surfaces 204a, 206a of two covers 204, 206. The covers 204, 206 may be in the form of prisms, having additional surfaces that are non-parallel to the surfaces 204a, 206a for transmitting light into and out of the PBS 200. In the illustrated embodiment, the covers 204, 206 are right angled prisms with the opposing surfaces 204a, 206a disposed at 45° relative to the output surface 204b reflective polarizing layer 202, although the surfaces 204a, 206a may be disposed at different angles. The covers 204, 206 may be attached to the reflective polarizing layer 202 using, for example, layers of adhesive 205a, 205b between the reflective polarizing layer 202 and the covers 204, 206 respectively. One suitable example of an adhesive is an optical epoxy as taught in U.S. Patent Publication No. 2004/0234774A1, incorporated herein by reference.

In some embodiments, the reflective polarizing layer 202 may be a multilayer optical film reflective polarizer, formed of alternating layers of different polymer materials, where one of the sets of alternating layers is formed of a birefringent material: the refractive indices of the different materials are matched for light polarized in one linear polarization state and unmatched for light in the orthogonal linear polarization state. Accordingly, incident light in the matched polarization state is substantially transmitted through the layer 202 and the light in the unmatched polarization state is substantially reflected by the layer 202.

Other types of reflecting polarizer layer may be used, for example, a stack of inorganic dielectric layers, as is often used in a MacNeille PBS, or wire grid polarizers used in glass prisms, as taught in U.S. Pat. No. 6,719,426, or any other polarization selective layer used in a similar way. The reflective polarizing layer 202 may be cemented to the covers 204, in a manner similar to that described above.

When unpolarized illumination light 210, or light of mixed polarization states, is incident on the PBS 200, the reflective polarizing layer 202 substantially reflects light in one polarization state 210a, referred to here as the s-polarization state, and substantially transmits the orthogonal polarization state, referred to here as the p-polarization state 210b. It should be noted, however that, when the PBS is a Cartesian MOF, the polarization states of the reflected and transmitted light are determined in reference to fixed material axes of the PBS: they are determined by the direction of a physical anisotropy of the reflecting polarizing layer itself. For a MacNeille polarizer, the polarization directions are determined with reference to the plane of reflection at the polarizer. Accordingly, the terms s-polarization and p-polarization are here used to denote the orthogonal polarization states of light that are primarily reflected and transmitted by the PBS respectively, both in the case of the MacNeille PBS, where this nomenclature is strictly accurate, and in the case of Cartesian PBSs, where the nomenclature is approximately and substantially accurate, and remains convenient. Wire grid polarizer and MOF polarizers are both examples of Cartesian polarizers.

The fraction of the incident s-polarized light reflected by the reflective polarizing layer 202 is given as $R_s$, and the fraction of the incident p-polarized light transmitted by the reflective polarizing layer 202 is given as $T_p$. Even if the reflective polarizing layer 202 were to be a perfect polarizer, reflecting only s-polarized light ($R_s=1$) and transmitting only p-polarized light ($T_p=1$), the light reaching the image forming device 212 is of mixed polarization, as is now explained.

The first cover 204 is under stress, which results in stress birefringence. The stress may arise for many different reasons. For example, the stress may result from mechanical considerations arising during the manufacturing process, or when the PBS 200 is mounted in the optical system. In addition, the stress may be thermal in nature, for example arising from illumination-induced thermal stress, or from a difference in the thermal expansion coefficients of the glass, the optical adhesive, the reflective polarizing layer, or the PBS mount. Thus, even when no p-polarized light is reflected, i.e., $T_p=1$, the reflected light 210a passes through the birefringent cover 204 to the image-forming device 212, and so the light reaching the image-forming device 212 contains both s-polarized and p-polarized light. There may also be additional birefringence in the layer of adhesive 205a between the reflective polarizing layer 202 and the first cover 204.

The retarding effect due to the stress-induced birefringence may be greater at one side of the PBS 200 than the other, as is now explained. The light ray 220 passes into the left hand edge of the first cover 204, propagates along a relatively long path in the first cover 204, and is then reflected as beam 220a along a relatively short path within the first cover 204 to the image-forming device 212. The light ray 230 passes into the right hand edge of the first cover 204, propagates along a relatively short path within the first cover 204 and is then reflected as beam 230a along a relatively long path within the cover 204 to the image-forming device 212. Thus, the light beam 230a reaching the image-forming device has passed through a longer path within the first cover 204 after reflecting off the reflective polarizing layer 202 than the beam 220a and, therefore, may contain a greater fraction of p-polarized light than beam 220a due to the birefringence in the first cover 204. Light beams 220b and 230b, transmitted through the reflective polarizing layer 202, may be dumped.

In the dark state, the image-forming device 212 does not substantially modulate the polarization of the reflected light, and so the polarization states of the light beams 222 and 232 reflected from the image-forming device 212 are substantially the same as the light incident at the image-forming device 212. Since beam 222 contains little p-polarized light, only a relatively small amount of light is transmitted by the reflective polarizing layer 202 as beam 222a, and a relatively large amount of light is reflected as beam 222b. Beam 232 on the other hand, contains a larger fraction of p-polarized light, which increases on passing back to the reflective polarizing layer 202, and so the light transmitted as beam 232a may have a greater intensity than beam 222a. Accordingly, beam 232b, reflected by the reflective polarizing layer 202, may be less intense than beam 222b. Thus, in the dark state, the image light may be non-uniform, and be brighter on one side of the PBS relative to the other.

The effect of stress birefringence in the first cover 204 applies to all light rays incident on the image-forming device, including on-axis rays and skew rays. Furthermore, the effect increases from one side of the PBS to another, and is, therefore, not symmetrical about the center of the illumination light beam, at least in the plane of reflection.

This behavior has been observed experimentally. Two experimental set-ups were used, shown in FIGS. 3A and 3B. In the set-up 300 shown in FIG. 3A, s-polarized light 302 from a high pressure, mercury arc lamp, was directed in an f/2.3 light beam to a MOF PBS 304. The MOF PBS 304 reflected substantially s-polarized light to a plain mirror 306, which was used to emulate a reflective image-forming device in the dark state. The light 308 that was reflected from the mirror 306 and transmitted through the PBS 304 was directed via a turning prism 310 to a lens 312 that formed an image of the mirror 306 on a 50" (127 cm) diagonal screen. The image on the screen was then captured using a ProMetric PM-1421-1 Imaging Colorimeter made by Radiant Imaging Inc. (Duval Wash.). The PBS was an MOF PBS, as described in co-owned U.S. Pat. Nos. 6,609,705, and 6,721,096, incorporated herein by reference. The PBS had a polarizing layer with values of both Tp and Rs exceeding 95% over the visible region (430 nm to 700 nm) for the f/2.3 light beam.

Figure 3A:
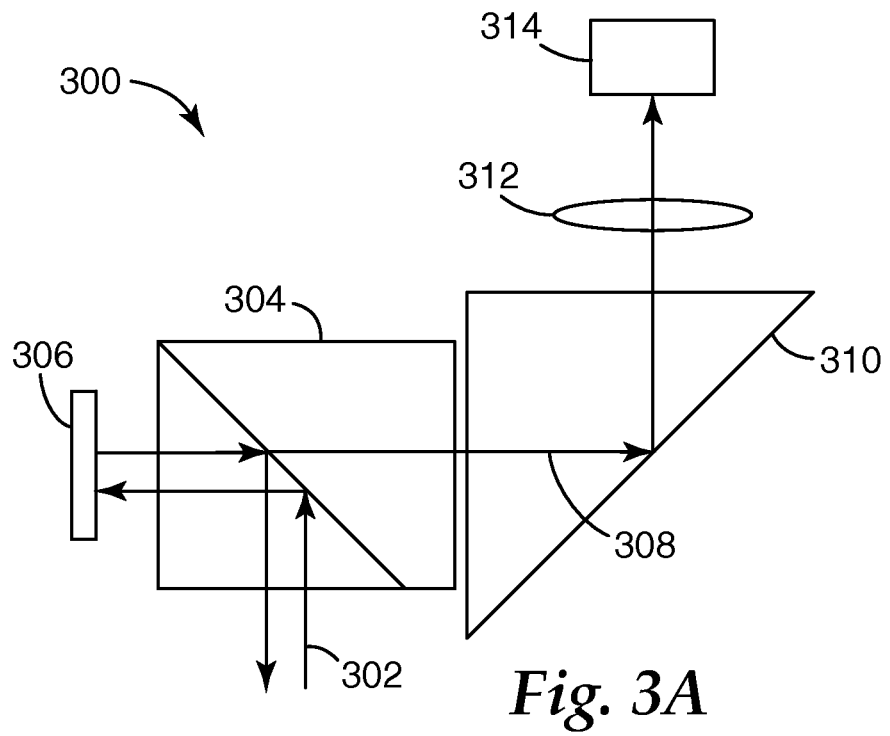
FIGS. 3A and 3B schematically illustrate experimental arrangements used for obtaining experimental results.
Figure 3B:
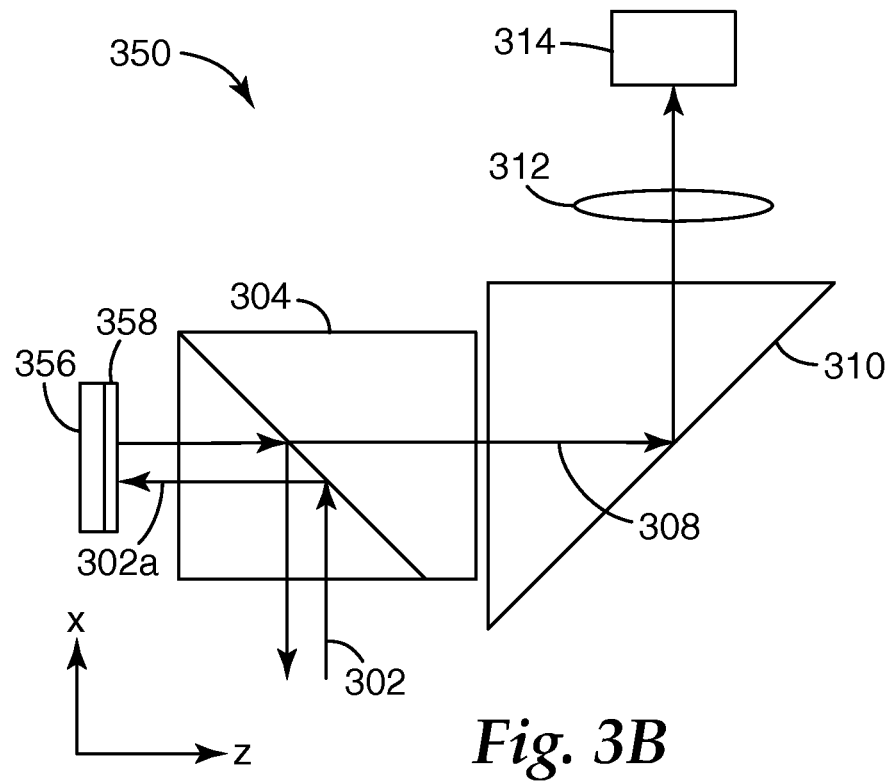

The set-up 350 shown in FIG. 3B is the same as that of FIG. 3A except that the mirror 306 was replaced with a quarter-wave mirror (QWM) 356, i.e., a mirror 357 with a quarter-wave retarder 358 attached. The dark-state image was recorded for each set-up 300, 350. The QWM 356 was rotated about an axis parallel to the z-axis to obtain the best dark state. A bright-state image was also recorded for the QWM set-up 350, by rotating the QWM 356 about an axis parallel to the z-axis to obtain the brightest beam at the screen.

Figure 4A:
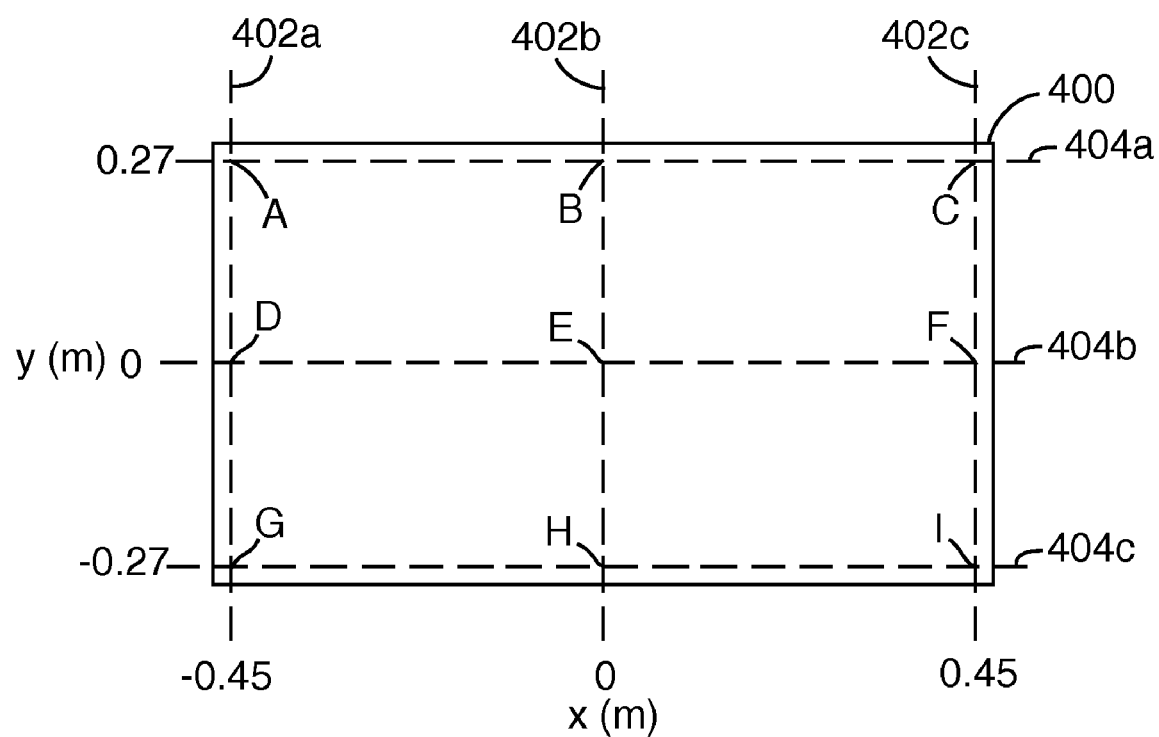
FIG. 4A schematically illustrates a projected image area.
Figure 4B:
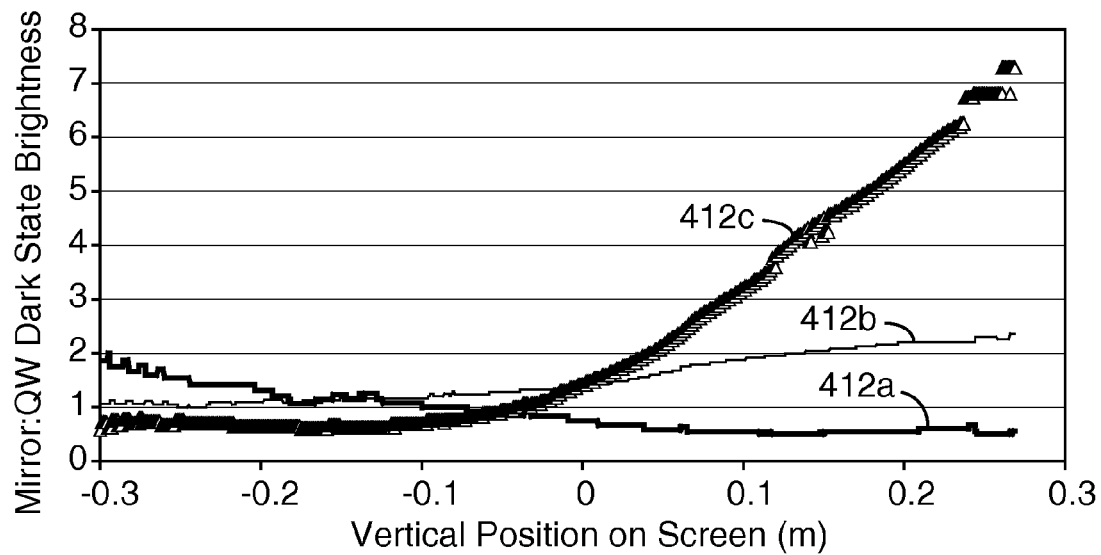
FIGS. 4B and 4C present experimental results showing the ratio of the brightness of the dark state light without quarter-wave compensation to the brightness of dark state light with quarter-wave compensation for different positions across the projected image area.

FIG. 4A schematically shows the outer perimeter of the projected image 400, having a 16:9 aspect ratio. The six dashed lines 402a-c, 404a-c, represent lines across the projected image. FIG. 4B shows the brightness of the mirror dark state along the three vertical lines 402a-c on the screen: curve 412a shows the dark state brightness along line 402a, curve 412b shows the dark state brightness along line 412b and curve 412c shows the dark state brightness along the line 402c. The values of the dark state brightness are normalized to the QWM dark state brightness, i.e., the values in the graph were obtained by dividing the mirror dark state brightness by the QWM dark state brightness. This removed some systematic artifacts from the results, for example arising from any nonuniformity in the intensity profile of the beam illuminating the mirrors.

The co-ordinate system places the origin at the center of the screen, where lines 402b and 404b cross. The vertical lines 402a-c have respective x-coordinates of −0.45, 0 and 0.45, and the horizontal lines 404a-c have respective y-coordinates of 0.27, 0 and −0.27. Therefore, the points marked A-I, the crossing points of the lines 402a-c and 404a-c, have the coordinates as follows A (−0.45, 0.27), B (0, 0.27), C (0.45, 0.27), D (−0.45, 0), E (0, 0), F (0.45, 0), G (−0.45, −0.27), H (0, −0.27), I (0.45, −0.27). The coordinates correspond to positions (in meters) measured on the projection screen.

Looking first at curve 412c, corresponding to the right side of the image, line 402c, the mirror dark state brightness is close to the QWM brightness for positions between about −0.3 m and zero m. However, for positions between zero m and 0.3 m, the relative brightness of the mirror dark state increases dramatically, up to a value of about 7. In other words, the mirror dark state is about seven times brighter than the QWM dark state. This means that there is significantly more dark state leakage at this region when there is no quarter wave retarder present. Thus, the top right corner of the image appeared brighter than the bottom left corner. The other curves 412a, 412b do not vary as much as curve 412c over the height of the image, showing that the dark state image is brightest in the top right corner of the image 400.

Figure 4C:
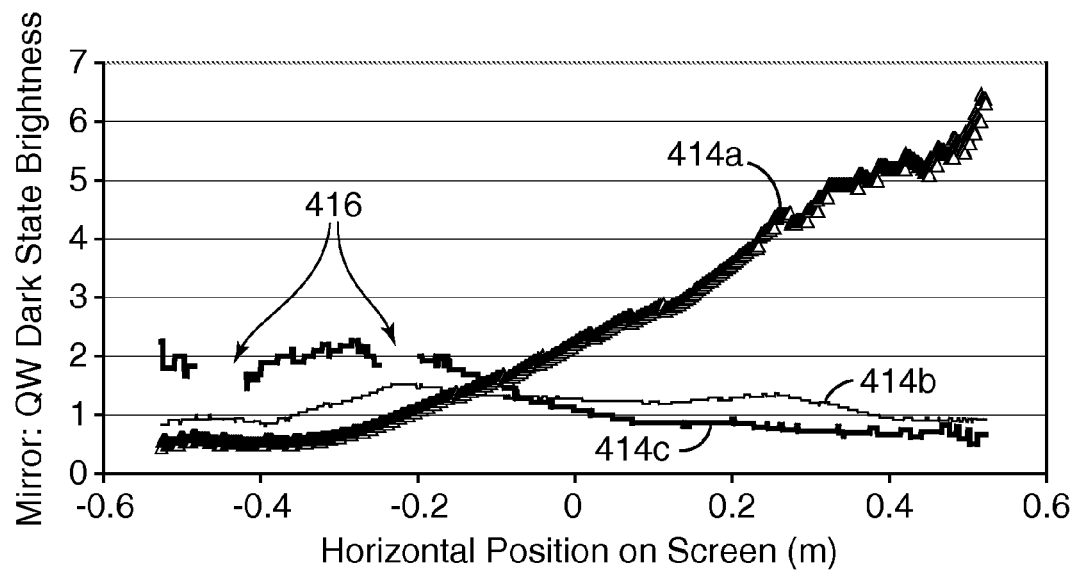

FIG. 4C shows the normalized brightness of the mirror dark state for the three horizontal lines 404a-c across the screen 400: curve 414a shows the dark state brightness along line 404a, curve 414b shows the dark state brightness along line 414b and curve 414c shows the dark state brightness along the line 404c. Curve 414a, showing the dark state image brightness for positions along the top of the image 400, has relatively low values for positions to the left side of the screen (positions less than zero m) but is high for positions to the right side of the screen. This is in agreement with the results discussed in the previous paragraph for the vertical lines 412a-c. Curves 414b and 414c are relatively flat, indicating that there is not much difference in the dark state intensity for the mirror 306 or the QWM 356 in these areas. The points marked 416 correspond to areas where the presence of dust prevented a realistic measurement of the dark state brightness.

The contrast ratio, the ratio of the bright state illuminance over the dark state illuminance, was calculated for nine different locations within the projected image area, corresponding to positions A-I. The contrast ratio was measured by measuring the brightness of the dark state light and the brightness of the brightest state when the QWM was rotated to a condition giving maximum transmission to the detector 314. The results of the contrast measurements for each of the set-ups 300 and 350 are summarized in Table I.

TABLE I

Contrast Ratios for various locations in the image light with and without quarter-wave compensation

| Dark State | A | B | C | D | E |
|---|---|---|---|---|---|
| Mirror (306) | 15214 | 2397 | 1051 | 7972 | 4294 |
| QWM (356) | 6052 | 5009 | 6844 | 8275 | 5754 |
| Dark State | F | G | H | I | |
| Mirror (306) | 6904 | 5926 | 6661 | 19171 | |
| QWM (356) | 6252 | 7723 | 8223 | 11486 | |

It is preferred that the contrast ratio for television projection systems be at a level of 2500 or above. As can be seen, points B and C do not meet this criterion when the mirror 306 alone was used: this is due to stress birefringence in the PBS cover. In contrast, the contrast ratio for the QWM dark state is well above 2500 for all points on the projected image.

For some points, for example points A and I, the contrast is significantly higher when the mirror 306 was used, rather than the QWM 356. These correspond to positions in the PBS cover that suffer from very little, or no stress birefringence. The resulting contrast ratio is reduced for the QWM projected image because of imperfections in the quarter-wave retarder 358, for example imperfections in orientation, possibly induced by mounting or inherent in the retarder 358 itself. In addition, the setup 350 using the QWM 356 was not wavelength optimized, and improved contrast performance is expected with optimized components. The quarter-wave retarder 358 on the QWM 356 was not spectrally neutral, but rather had a birefringence of about 137 nm. Therefore, the quarter-wave film only provided true quarter-wave retardation for wavelengths near 550 nm. Improved contrast results would be expected in the QWM case by narrowing the bandwidth of the incident light used or by using a QWM 356 having a flatter retardation over the wavelength range of the illumination light. Note that, in 3-panel projection systems, the bandwidth of the light incident on the image-producing device is typically about 70 nm or less, and the optical elements, including the PBS and the quarter-wave retarder, may be optimized for operation in each projected color band.

The effect of using a quarter-wave retarder (QWR) has been modeled utilizing Mueller Matrix polarization modeling. The simplest model that demonstrates the effect includes crossed linear polarizers for the equivalent function of the PBS function: crossed polarizers are equivalent to one reflection and one transmission through the PBS. Between the equivalent polarizers are placed birefringent glass, to model the PBS cover, a QWR, an LCoS imager with some stray retardance, and a mirror.

Figure 5:
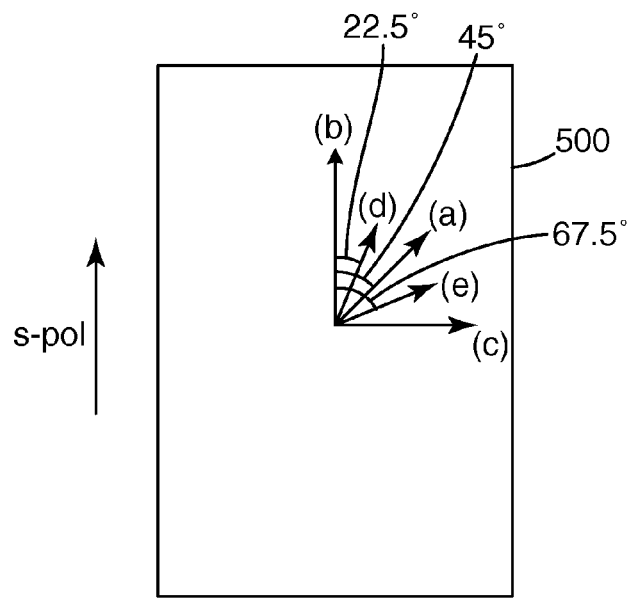
FIG. 5 schematically illustrates birefringence angle in the cover of a polarizing beamsplitter.

FIG. 5 schematically illustrates a face (500) of a PBS, showing the direction of the polarization (s-pol), and various arrows in the face 500 showing different directions of birefringence. The direction of the birefringence is dependent on the direction of the stress in the glass material. The resulting analysis shows that a QWR compensator substantially corrects any level of birefringence, or stress, oriented at 45° to the polarization direction, the arrow labeled (a). Stress oriented at 0° or 90° (arrows (b) and (c) respectively) has no effect on the polarization of the polarized light beam. The analysis indicates that stress oriented at 22.5° (modulo)45° (arrows (d) and (e)) is the most difficult to compensate with the QWR.

Figure 6A:
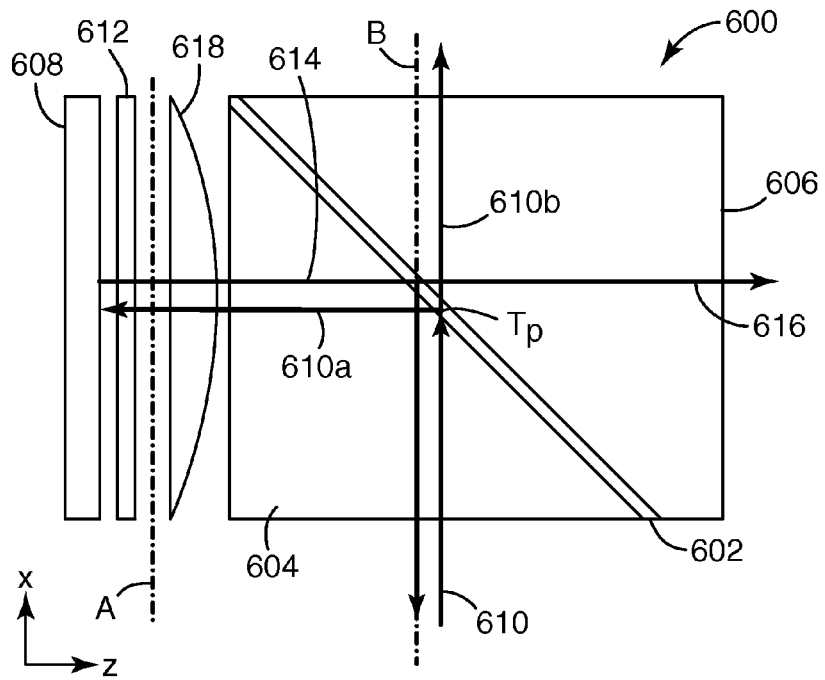
FIG. 6A schematically illustrates an embodiment of a polarizing beamsplitter with a quarter wave retarder compensator, according to principles of the present invention.

The reasons for this behavior are now discussed with reference to FIGS. 6A-D. FIG. 6A schematically illustrates a light beam 610 entering a PBS 600 formed by a reflective polarizing layer 602 between two covers 604, 606. The light enters the first cover 604, and reflects off the reflective polarizing layer 602 towards the image-forming device 608. The first cover 604 displays stress birefringence.

The light 610 is polarized, or repolarized if it had previously been prepolarized, at the reflective polarizing layer 602. This assumes that the reflective polarizing layer 602 has high values of $T_p$, at least over 90% across the bandwidth of the incident light and range of incident angles, preferably over 92% and more preferably over 94%. The multilayer film polarizing layers described in U.S. Pat. No. 6,609,795 achieve high values of $T_p$, reaching typical values of between 96% and 98% for an f/2.3 beam over the entire wavelength range of 430 nm to 700 nm. Thus, only a small fraction of the light in the unwanted polarization state is reflected to the image-forming device 608.

Figure 6B:
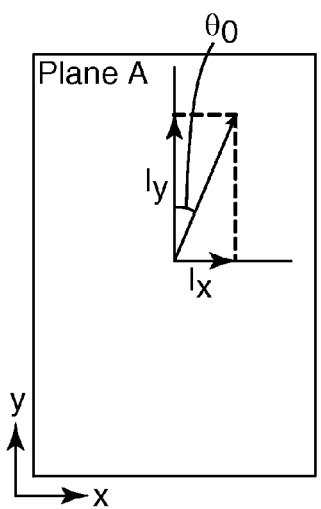
FIGS. 6B-6D present graphs showing polarization angle for light at various points within the arrangement of FIG. 6A.

The reflected light 610a propagates along a path through the first cover 604. Upon exiting the first cover 604, the polarization state of the light 610a at plane A, a plane perpendicular to the z-axis, is a combination of orthogonally polarized components. An exemplary selection of polarization components for the light beam is shown in FIG. 6B, which shows the polarization state of a portion of beam 610a passing through a region of glass retardation, as seen by a viewer looking through the PBS 600 at the image-forming device, along the negative z direction. The s-polarization direction is assumed to be parallel to the y-direction and the p-polarization direction is assumed to be parallel to the x-direction, as would be the case for an axial ray. The light beam 610 has a polarization angle of $\theta_0$ relative to the y-axis (s-polarization direction). The light is elliptically polarized and the polarization angle, $\theta_0$, is the direction of the major axis of the polarization ellipse. The polarization angle $\theta_0$, for retardation at 45° to the polarization direction, is obtained using the expression:

$$\theta_0 = \tan^{-1}(I_x/I_y),$$

where $I_x = I_o \cdot \sin^2(2\pi \Delta n \cdot d/\lambda)$, and $$I_y = I_o \cdot \cos^2(2\pi \Delta n \cdot d/\lambda).$$

$I_0$ is the intensity of the incoming beam, $I_x$ and $I_y$ are the relative intensities for light polarized parallel to the x-axis (p-polarized light) and light polarized parallel to the y-axis (s-polarized light), respectively, $\Delta n \cdot d$ is the total summed retardation along the light path in the region of glass under consideration, and $\lambda$ is the wavelength of the light in vacuum. For other orientations of the retardation the equation is more complex, but qualitatively similar. The actual value of $\theta_0$ depends on the retardance of the first cover 604 and, in practical situations, may have a value less than that illustrated in FIG. 6B. The particular value of $\theta_0$ illustrated in FIG. 6B was selected for illustrative purposes only.

Figure 6C:
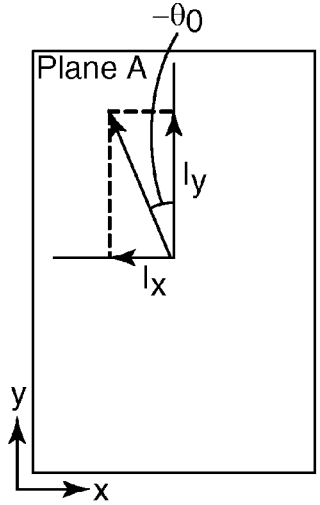

The light beam 610a passes through the through the QWR 612 and reflects off the image-forming device 608 as reflected beam 614 and passes once more through the QWR. The double-pass through the QWR 612 is functionally equivalent to passing through a half-wave retarder. As a result, the polarization angle of the reflected beam 614 is flipped to $-\theta_0$. FIG. 6C shows the polarization angle of the reflected beam 614 at the plane A, after reflecting from the image-forming device 608.

Figure 6D:
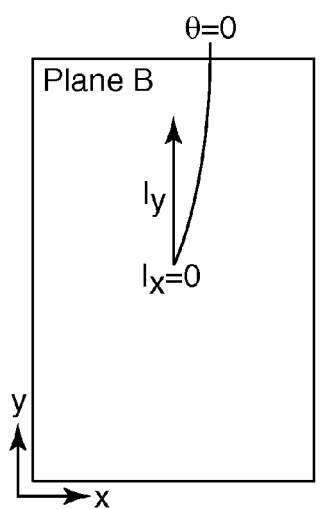

After passing back through the QWR 612, the light beam 614 follows approximately the same path through the cover 604 to the reflective polarizing layer 602 and, therefore, experiences substantially the same retardation due to stress birefringence as the light 610 did on the incoming path. Since the polarization angle of the light beam 614 is inverted relative to the light beam 610 at plane A, however, the net effect is that, once the beam 614 has passed back through the first cover 604 to the polarizing layer 602, the polarization angle, $\theta$, has been rotated back to a value at, or close to, zero. This is schematically illustrated in FIG. 6D, which shows the polarization state of the light beam 614 at plane B, at the reflective polarizing layer 602. In the illustrated example, the compensation is ideal and the light beam 614 is s-polarized, parallel to the y-axis. This light will be reflected by the polarizing layer 602 of the PBS 600 and does not contribute substantially to the brightness of the projected image, as should be the case for a dark state image. The polarization-modulated light 614, on the other hand, passes through the reflective polarizing layer 602 as image light. It will be appreciated that compensation for the birefringence of the PBS cover may not always be complete, for reasons discussed below. However, the degree of compensation can be significant, and permits lead-free glasses to be used in PBSs with high contrast.

The compensation of stress birefringence using a QWR 612 works well for light 610a that is on-axis, i.e., light that propagates through the first cover 604 from the reflective polarizing layer 602 in a direction parallel to the z-axis, and where the reflective polarizer has a value of $T_p$ that is relatively high. In practice, however, the conditions are less advantageous. For example, an image-forming element is typically illuminated with light that falls within a specified cone angle and, as a result, the light rays incident at the image-forming device 608 are not necessarily parallel to the z-axis. Thus, the birefringence history for the incoming and outgoing light rays becomes different: the rotation of the polarization angle for the illumination light is increasingly different from the rotation of the polarization for the reflected light rays propagating at increased angles from the z-axis. Thus, the extent to which the stress birefringence in the first cover 604 is compensated may be reduced.

Furthermore, as the value of $T_p$ drops below 100%, the light reflected by the reflective polarizing layer 604 towards the image-forming device 608 contains an increasing amount of p-polarized light. Only the birefringence effects after reflection from the polarizing layer 602, on the optical path between the polarizing layer 602 and the image-forming device 608, are compensated by the polarization angle inversion due to the QWR 612. Accordingly, to the extent that the reflected light 602a contains p-polarized light, the contrast will be degraded. Thus, it is very important that the $T_p$ be high, so as to reduce the amount of p-polarized light reflected at the reflective polarizing layer 602. This approach to reducing the effects of stress birefringence is most useful, therefore, when the value of $T_p$ is higher than 90% for extreme rays when using illumination light having a useful f-number, say f/3.0 or even down to f/2.0 or less. Preferably, the value of $T_p$ is higher than 92% and more preferably higher than 94%.

The QWR 612 at least partially compensates for birefringence in any component elements, in addition to the PBS cover 604, located between the polarizing layer 602 and the QWR 612. For example, the QWR 612 may compensate for birefringence arising in an adhesive layer between the cover 604 and the polarizing layer 602. In addition, an optional field lens 618 may be positioned close to the image-forming device 608: this arrangement gains additional design freedom for the projection lens, especially in terms of lateral color. Birefringence in the field lens 618 may be compensated by the QWR 612 if the field lens 618 is positioned between the QWR 612 and the polarizing layer 612. Other component elements that might be positioned between the QWR 612 and the polarizing layer 602 include, for example, a glass substrate (not shown) for supporting the QWR 612.

The optical surfaces between the mirror surface of the image-forming device 608 and the polarizing layer 602 are may be provided with antireflection properties, for example using an antireflection coating. This reduces reflection losses, thus increasing optical throughput in the image light. Also, the use of antireflection surfaces may reduce the occurrence of haloes around bright areas set against a dark background in a projected image. Such haloes may arise from rays diverging from the bright area off an optical surface back to the mirror in the image-forming device 608. The light then reflects off the mirror with the correct polarization state to pass through the PBS 600 as image light. These rays lie outside the bright area and appear to the viewer to originate from the dark area immediately surrounding the bright area.

Figure 7:
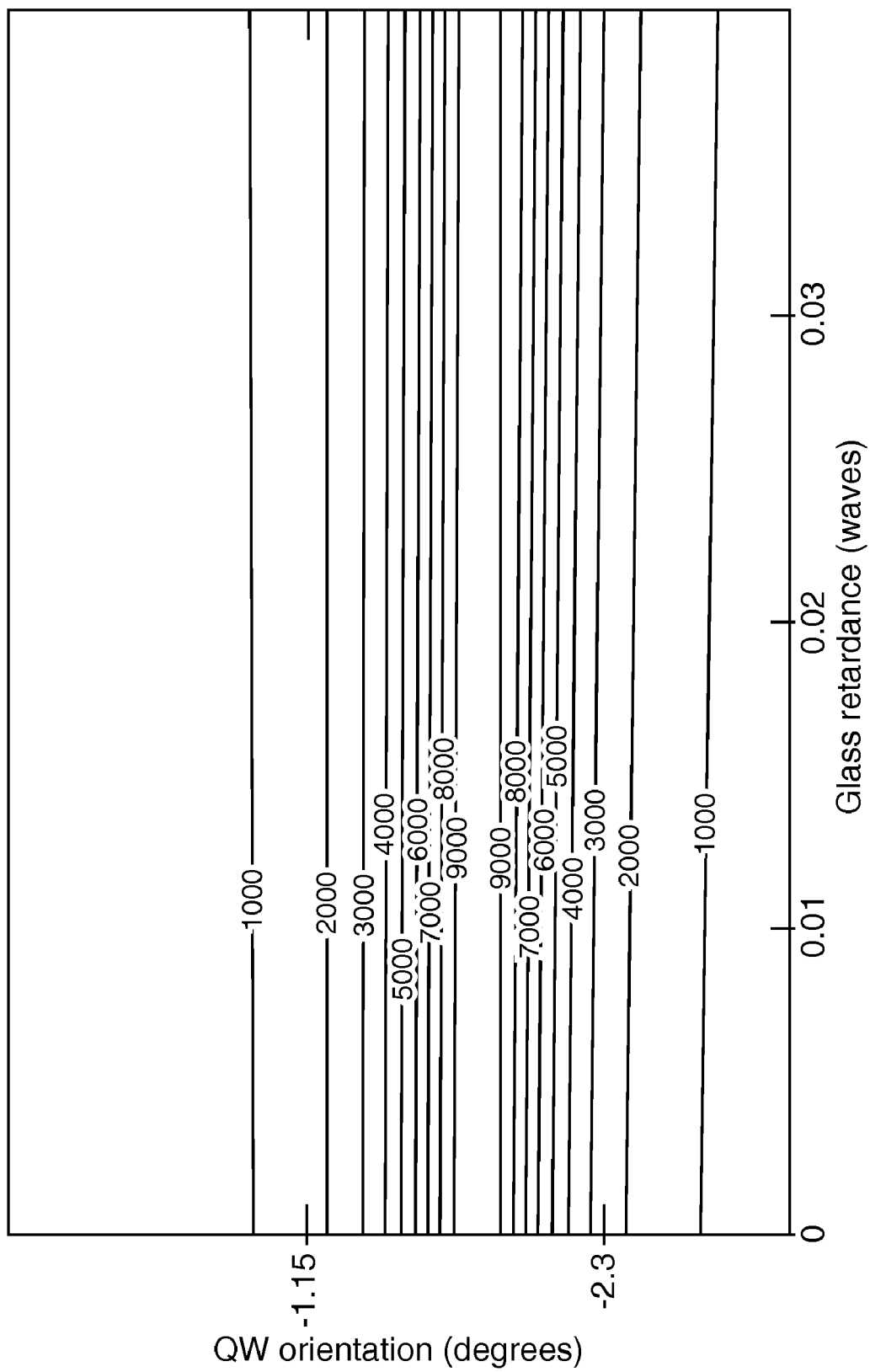
FIG. 7 presents a graph showing a calculated contour plot of contrast as a function of i) birefringence in the glass cover of a polarizing beamsplitter and ii) orientation angle of the quarter-wave retarder, for a birefringence angle of 45°.

Some results from the numerical modeling are now discussed. FIG. 7 shows a contour plot showing the calculated contrast ratios as a function of i) retardance in the glass cover 604 for a single-pass through the glass cover, between the polarizing layer 602 and the image-forming device 608, and ii) the orientation of the QWR 612. The orientation of the QWR 612 is provided in degrees relative to the condition where the fast axis of the QWR 612 is parallel or perpendicular to the plane of reflection. The birefringence in the cover 604 was assumed to be at 45° relative to the plane of reflection. The model assumed that the image-forming device is a VAN-mode liquid crystal display panel with an in-plane residual birefringence of 5 nm at 45° relative to the plane of reflection. As can be seen, the maximum contrast is achieved when the QWR 612 is rotated with its fast axis at about 1.8° relative to the plane of reflection. This calculation assumed a value of Tp=100% in the PBS 600. Since some MOF PBSs may demonstrate a value of Tp exceeding 98%, this assumption is not unreasonable. Note that, as discussed above, any amount of birefringence in the glass cover 604 is exactly compensated with one single orientation of the QWR 612 for this orientation of birefringence in the glass cover 604.

Figure 8:
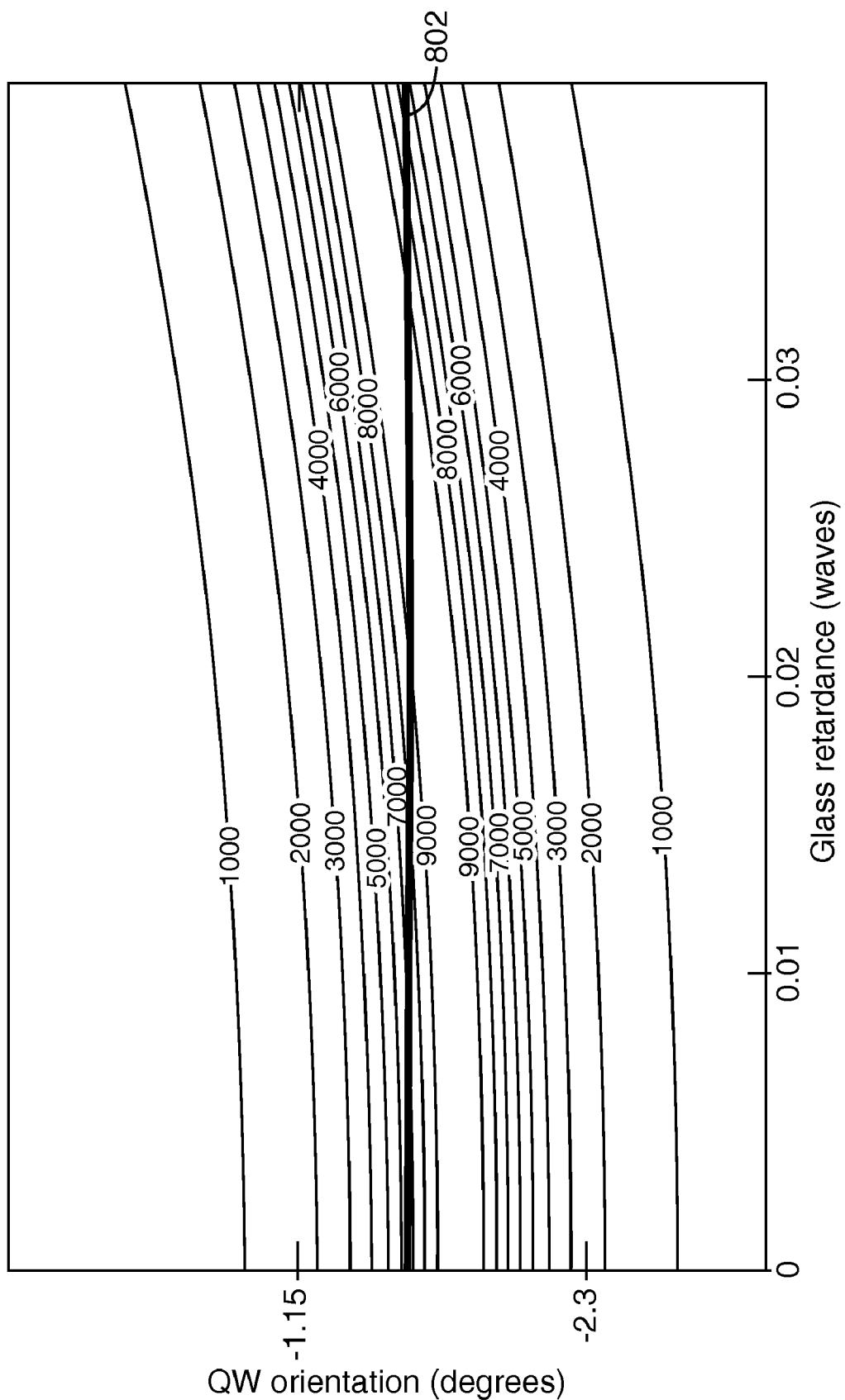
FIG. 8 presents a graph showing a calculated contour plot of contrast as a function of i) birefringence in the glass cover of a polarizing beamsplitter and ii) orientation angle of the quarter-wave retarder, for a birefringence angle of 22.5°.

FIG. 8 shows a contour plot similar to that of FIG. 7, but for the birefringence in the glass cover 604 oriented at 22.5°, which is the most difficult condition to compensate using this approach. It is clear that, at some level of retardation, the QWR will not perfectly compensate the birefringence. However, judicious selection of the orientation angle of the QWR, for example at the level indicated by the straight line 802, still provides for a relatively high contrast ratio, in excess of 6000:1, for a glass cover retardance up to 20 nm. It should be noted that, in a practical PBS, the birefringence in a glass cover is not all oriented at 22.5° and, hence, the actual contrast ratio obtainable may be higher than shown in this graph.

Thus, the QWR may be used to compensate for levels of retardation in the cover that are greater than 1 nm, greater than 5 nm and greater than 10 nm.

Figure 9:
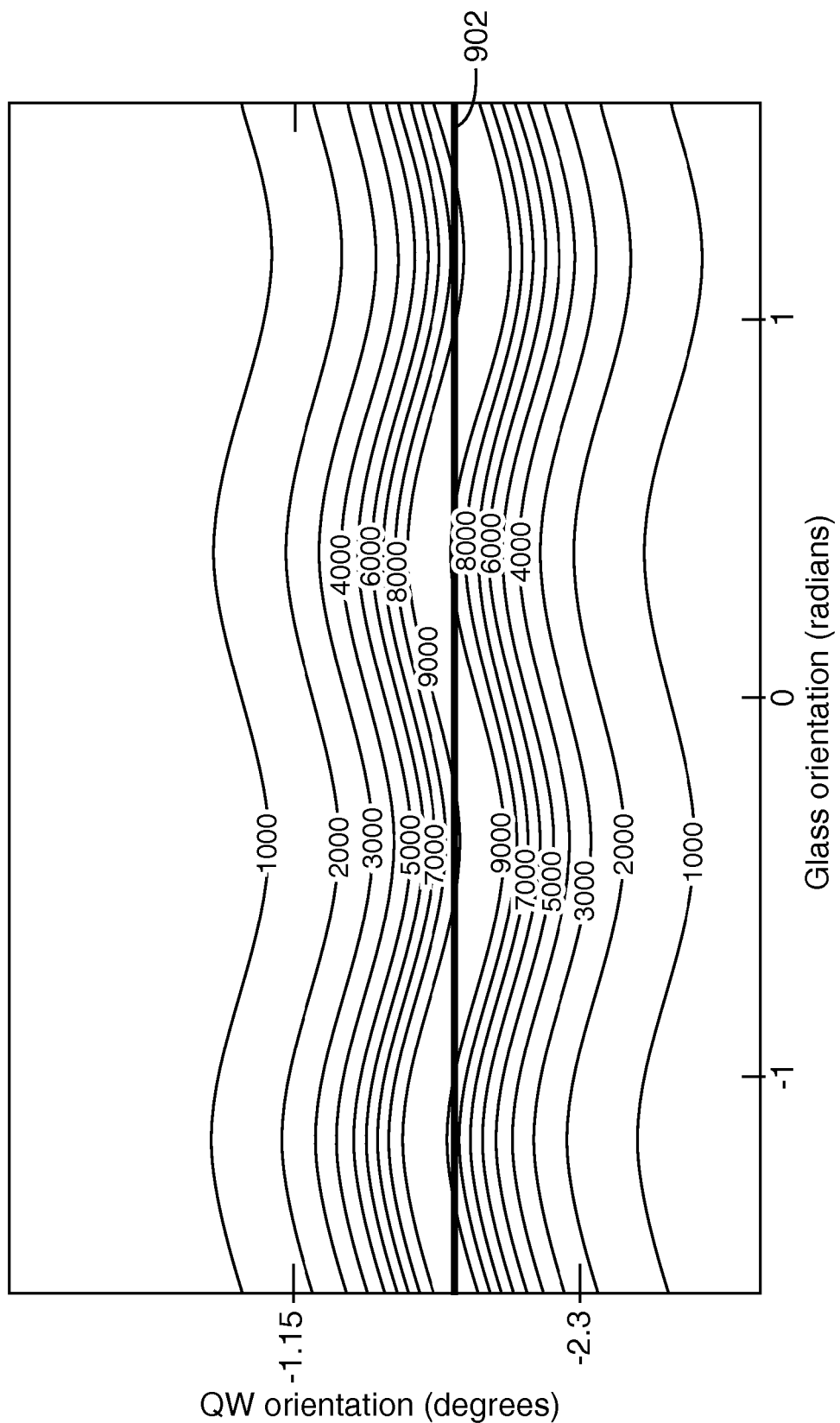
FIG. 9 presents a graph showing a calculated contour plot of contrast as a function of i) the birefringence angle and ii) the orientation of the quarter-wave retarder for a retardation of 10 nm in the glass cover.

FIG. 9 shows a contour plot of contrast as a function of the orientation angle of the birefringence in the cover 604 and orientation of the QWR 612. The results in this plot were obtained under the assumption that the retardation of the glass cover 604 was 10 nm. These results clearly show that a single orientation of the QWR 612, as indicated by the horizontal line 902, provides high contrast performance for any angle of birefringence orientation, in excess of 8000:1.

Figure 10:
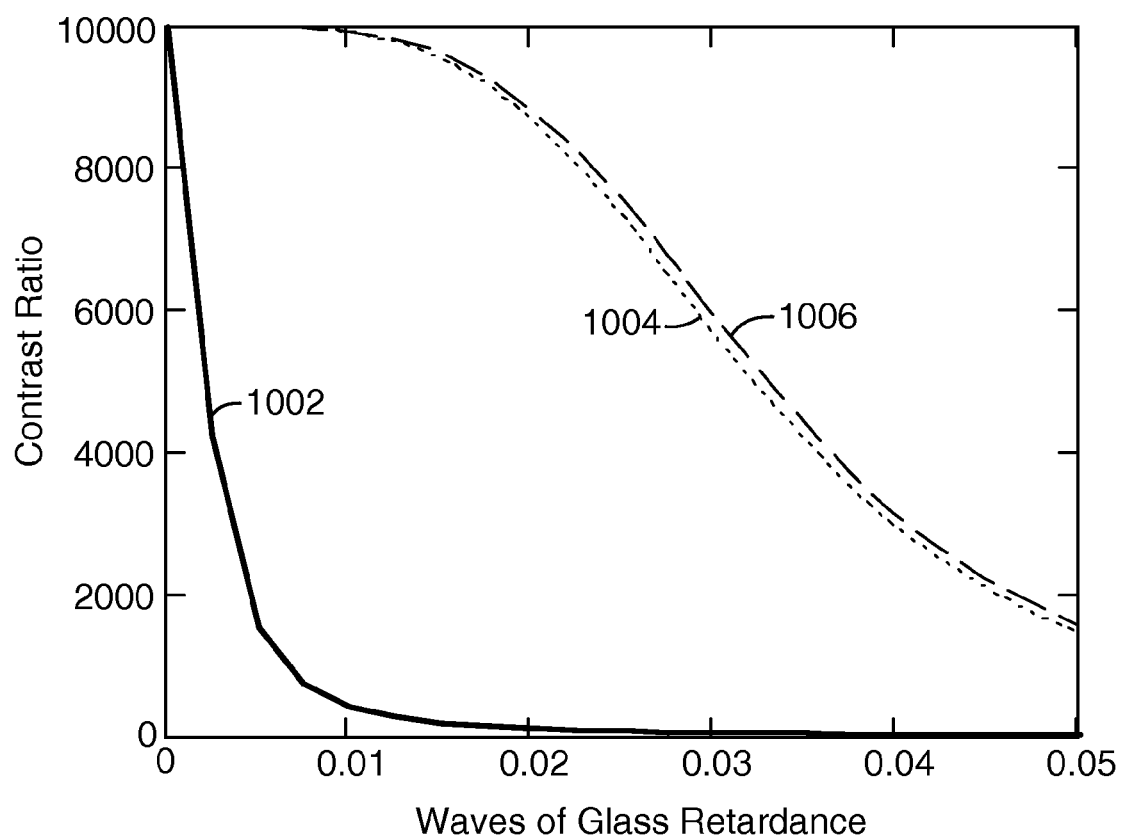
FIG. 10 presents a graph showing the contrast as a function of birefringence in the glass cover with and without compensation using a quarter-wave retarder.

FIG. 10 presents a graph that compares the contrast as a function of retardation in the glass cover 604 for a) no QWR compensation, curve 1002, b) optimized QWR compensation, curve 1004, assuming no residual birefringence in the image-forming device and c) optimized QWR compensation, curve 1006, where there is about 5 nm of residual retardation at 45° to the incoming polarization state in the off-state. The orientation of the birefringence in the glass cover 604 was assumed to be 25°. Without compensation, curve 1002, the contrast drops rapidly at small values of retardation in the glass cover 604. At about 0.004 waves of retardation (~2 nm for visible light), the contrast is reduced by half. In the compensated cases, however, curves 1004, 1006, the retardation magnitude must exceed 0.03 (~15 nm for visible light) to cause a similar level of contrast reduction. Useful PBS contrast levels should exceed 2500:1 for most rear-projection television (RPTV). The results in FIG. 10 show that this level of contrast requires that there be no more than 0.004 waves of retardation at a stress orientation of 25°, when there is no QWR compensation. In comparison, the birefringence-compensated system can tolerate at least ten times this level of birefringence, while still meeting the contrast requirement of 2500:1. From the experimental results summarized in Table I, it can be estimated that the glass cover has a stress-induced retardation of about 0.0085 waves (about 4.7 nm for visible light), which is more than the uncompensated system can tolerate, but well within the levels of retardation acceptable with a compensated system.

Another factor that may be considered in reducing the effects of stress-induced birefringence, in addition to compensating with a QWR, is to reduce the amount of stress applied to the PBS. Some sources of stress, such as thermally induced stress arising from optical absorption of the light in the PBS glass, are difficult to avoid. Other sources of stress, for example stresses arising from mounting may be reduced through careful engineering and design.

It is often convenient to provide an optical core comprising the PBS, or PBSs, attached to an optical element. For example, the projection system 100 of FIG. 1 shows the PBSs 112a, 112b, 112c attached to the color combiner unit 116, for example using an optical adhesive such as a pressure sensitive adhesive or optical epoxy.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A method of compensating for birefringence in an image projection system, comprising:

polarizing light at a polarizing layer substantially into a selected polarization state;

directing the polarized light to an image-forming device through a birefringent element;

reflecting the polarized light at the image-forming device;

analyzing the reflected polarized light at the polarizing layer; and passing the polarized light and the reflected polarized light through a quarter-wave retarding element disposed between the birefringent element and the image-forming device, the quarter-wave retarding element oriented to substantially optimize compensation of retardance in the birefringent element.

2. A method as recited in claim 1, further comprising generating the light and directing the light to the polarizing layer.

3. A method as recited in claim 1, further comprising projecting the analyzed light to a screen.

\* \* \* \* \*

UNITED STATES PATENT AND TRADEMARK OFFICE
CERTIFICATE OF CORRECTION

| | | |
|---|---|---|
| PATENT NO. | : 8,100,535 B2 | Page 1 of 1 |
| APPLICATION NO. | : 12/765503 | |
| DATED | : January 24, 2012 | |
| INVENTOR(S) | : David John Williams Aastuen | |

It is certified that error appears in the above-identified patent and that said Letters Patent is hereby corrected as shown below:

<u>Column 11</u>,
Line 11, Delete "(modulo)45°" and insert -- (modulo 45°) --, therefor.

Signed and Sealed this
Twentieth Day of March, 2012

David J. Kappos
*Director of the United States Patent and Trademark Office*